United States Patent Office 3,270,007
Patented August 30, 1966

3,270,007
PROCESS FOR CYCLOPENTANOPHENANTHRENE COMPOUNDS
Francisco Alvarez, Palo Alto, Calif., assignor to Syntex Corporation, Panama, Panama, a corporation of Panama
No Drawing. Filed Aug. 31, 1964, Ser. No. 393,392
Claims priority, application Mexico, Oct. 29, 1963, 74,437
6 Claims. (Cl. 260—239.55)

The present invention relates to a new process for preparing certain cyclopentanophenanthrene derivatives.

More particularly, the present invention relates to a new process for preparing 17α-ethinyl-Δ5(10)-19-norandrosten - 17β-ol-3-one, 17α-ethinyl-19-nor-testosterone and the esters of this latter compound.

17α-ethinyl-19-nor-testosterone and 17α-ethinyl-Δ5(10)-19-nor-androsten-17β-ol-3-one are compounds of great importance due to its progestational activity by the oral route. Several processes for the production of these compounds have been reported, however, the majority of them involve the reduction of ring A aromatic compounds, thus resulting in low yields.

The novel method of the present invention does not involve the reduction of a Δ1,3,5(10)-estratriene but employs a ring A saturated compound as starting material with the result that very good yields are obtained.

In accordance with the present invention the surprising discovery has been made that by hydrogenolysis of a 3-hydroxy or 3-acyloxy-Δ5(10)-19-nor androstene compound substituted at C–6 by an acyloxy group, a halogen atom or any other substituent susceptible of hydrogenolysis, elimination of the substituent at C–6 is achieved, without effecting the double bond at C–5(10).

The method for producing 17α-ethinyl-Δ5(10)-19-norandrosten - 17β - ol-3-one, 17α-ethinyl-19-nor-testosterone and its esters is illustrated in detail by the following sequence of reactions:

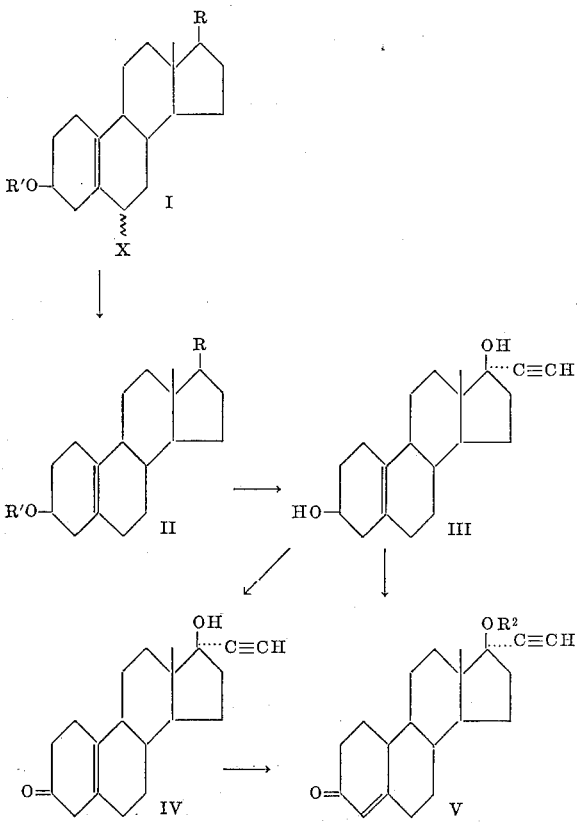

In the preceding formulas R represents keto which may be protected as the ethylenedioxy derivative; X represents chlorine, bromine or an acyloxy group of less than 12 carbon atoms, preferably the acetoxy group; $R^1$ and $R^2$ represent hydrogen or an acyl group of less than 12 carbon atoms. The wavy line at C–6 indicates the α or β configuration for the substituent in such position.

The acyl and acyloxy groups are derived from hydrocarbon carboxylic acids containing less than 12 carbon atoms which may be saturated or unsaturated, of straight, branched, cyclic or cyclic-aliphatic chain, aromatic and may be substituted by functional groups such as hydroxy, alkoxy containing up to 5 carbon atoms, acyloxy containing up to 12 carbon atoms, nitro, amino or halogen. Typical ester groups are the acetate, propionate, enanthate, benzoate, trimethylacetate, t-butylacetate, phenoxyacetate, cyclopentylpropionate, aminoacetate, and β-chloropropionate.

In practicing the process illustrated above, there is used as starting material a Δ5(10)-19-nor-androstene (I) substituted at C–3 by a free or esterified hydroxyl group, at C–6 by an acyloxy radical of less than 12 carbon atoms, preferably the acetoxy group or by a chlorine or bromine atom, and at C–17 by a keto group or the ethylenedioxy grouping. Upon hydrogenolysis of these compounds, the substituent at C–6 is eliminated, thus yielding the corresponding Δ5(10)-19-nor-androstenes (II). The hydrogenolysis is effected preferably by hydrogenation in the presence of a suitable catalyst such as palladium on charcoal or other catalyst derived from heavy metals such as platinum oxide, ruthenium oxide etc., until absorption of 1 molar equivalent of hydrogen. Suitable solvents for this reaction are the lower aliphatic alcohols such as methanol or ethanol. This reaction is effected preferably at room temperature and atmospheric pressure, however, these conditions may be varied without affecting its course.

Examples of starting materials for this reaction are: 6-acetoxy-Δ5(10)-19-nor-androsten-3β-ol-17-one, 3,6-diacetoxy - Δ5(10)-19-nor-androsten-17-one, 17-ethylenedioxy-6-acetoxy - Δ5(10)-19-nor-androsten-3β-ol, 17-ethylenedioxy-6 - chloro-Δ5(10)-19-nor-androsten-3β-ol acetate, 17-ethylenedioxy - 6-bromo-Δ5(10)-19-nor-androsten-3β-ol acetate, and 17 - ethylenedioxy-Δ5(10)-19-nor-androstene-3β,6-diol diacetate.

When 6-acetoxy-17-ethylenedioxy-Δ5(10)-19-nor-androsten-3β-ol (I, R=ethylenedioxy; $R^1$=H; X=acetoxy) is used as the starting material, the hydrogenolysis may also be carried out by reaction with calcium in liquid ammonia or lithium in ethylamine at a temperature comprised between 0 and —40° C. or with zinc in acetic acid at a temperature comprised between the ambient and 100° C. for a period of time of between 30 minutes and 3 hours.

In any of the cases where the starting material used for the hydrogenolysis possess a keto group at C–17 protected in the form of the ethylenedioxy derivative, said reaction is followed by a treatment with a strong acid such as, for example, by treatment with p-toluenesulfonic acid in acetone or perchloric acid in methanol, thus regenerating the 17-keto grouping. By conventional treatment of Δ5(10)-19-nor-androsten-3β-ol-17-one (II, R=keto) or an ester thereof with sodium or potassium acetylide in t-amyl alcohol or t-butanol solution at room temperature and for a period of time of approximately 40 hours, or by reaction with diethinyl magnesium bromide, preferably at reflux temperature, there is obtained 17α-ethinyl-Δ5(10)-19-nor-androstene-3β,17β-diol (III), which upon oxidation with chromic acid in pyridine gives rise to 17α-ethinyl-Δ5(10)-19-nor-androsten-17β-ol-3-one (IV). By acid or alkaline treatment of this latter compound using, for example, hydrochloric acid in methanol or potassium hydroxide in methanol, at a temperature comprised between 0° C. and room temperature, a shifting of the double bond from C–5(10) to C–4, 5 is effected, thus producing 17α-ethinyl-19-nor-testosterone (V, $R^2=H$).

Alternatively, by oxidation of 17α-ethinyl-$\Delta^{5(10)}$-19-nor-androstene-3β,17β-diol (III) with an aluminum alkoxide in the presence of a hydrogen acceptor (Oppenauer oxidation) using preferably aluminum isopropoxide in toluene solution and in the presence of cyclohexanone, there is obtained directly 17α-ethinyl-19-nor-testostreone (V, $R^2=H$).

The conventional esterification of this compound using preferably carboxylic acid anhydrides of less than 12 carbon atoms in benzene solution and in the presence of p-toluenesulfonic acid gives rise to the corresponding acylates, (V, $R^2=$acyl).

The following examples serve to illustrate but are not intended to limit the scope of the present invention.

PREPARATION 1

A mixture of 5 g. of $\Delta^5$-androstene-3β,19-diol-17-one, 125 cc. of dry benzene, 25 cc. of ethylene glycol and 250 mg. of p-toluenesulfonic acid monohydrate was refluxed for 8 hours using a water separator. The cooled reaction mixture was then washed with a sodium bicarbonate solution and water to neutrality, dried over anhydrous sodium sulfate and evaporated to dryness, thus producing 17-ethylenedioxy-$\Delta^5$-androstene-3β,19-diol.

In the same manner, starting from the 3-monoacetate of $\Delta^5$-androstene-3β,19-diol-17-one there was obtained 3-acetoxy-17-ethylenedioxy-$\Delta^5$-androsten-19-ol.

PREPARATION 2

To a solution of 10 g. of $\Delta^5$-androstene-3β,19-diol-17-one in 150 cc. of thiophene-free benzene there were added 21.6 g. of lead tetraacetate (1.5 equivalents) and 20 g. of calcium carbonate and the reaction mixture was refluxed for 6 hours under stirring; the insoluble material was filtered off and the filtrate diluted with water. The organic layer was separated and washed to neutrality, dried over anhydrous sodium sulfate and evaporated to dryness. under vacuo. Chromatography of the residue on 500 g. of washed alumina gave 6-acetoxy-$\Delta^{5(10)}$-19-nor-androsten-3β-ol-17-one (mixture of 6α and 6β-isomers).

PREPARATION 3

A solution of 5 g. of 3-acetoxy-17-ethylene-dioxy-$\Delta^5$-androsten-19-ol, in 100 cc. of pyridine was added to a mixture of 5 g. of chromic trioxide in 100 cc. of pyridine. The reaction mixture was kept at room temperature for one week. It was then diluted with ethyl acetate, filtered through Celite and the filtrate washed well with water, dried and evaporated to dryness. Crystallization from acetone-hexane afforded 17-ethylenedioxy-$\Delta^{5(10)}$-19-nor-androsten-3β-ol-6-one acetate.

To a solution of 2 g. of the foregoing compound in 40 cc. of dioxane there was added 2 g. of sodium borohydride and the reaction mixture was kept overnight at room temperature and under stirring; the excess reagent was decomposed by the addition of acetic acid, the resulting solution was concentrated to a small volume under vacuo and diluted with water. The product was extracted with ethyl acetate, and the extract was washed with water, dried and evaporated. Crystallization of the solid residue from acetone-hexane gave the 3-acetate of 17-ethylenedioxy-$\Delta^{5(10)}$-19-nor-androstene-3β,6-diol (mixture of 6α and 6β isomers).

A solution of 1 g. of the preceding compound in 50 cc. of anhydrous ether was treated at 0° C. with 1.5 cc. of purified thionyl chloride. The reaction mixture was kept at the same temperature for 6 minutes and then washed with an aqueous sodium bicarbonate solution and water, dried over anhydrous sodium sulfate and evaporated to dryness. Crystallization of the solid residue from ether-hexane gave the acetate of 3-ethylenedioxy-6-chloro-$\Delta^{5(10)}$-19-nor-androsten-3β-ol (mixture of 6α and 6β-isomers).

PREPARATION 4

In the method of the preceding preparation thionyl chloride was substituted by thionyl bromide, to produce as final product the acetate of 17-ethylenedioxy-6-bromo-$\Delta^{5(10)}$-19-nor-androsten-3β-ol.

PREPARATION 5

A mixture of 1 g. of the 3-acetate of 17-ethylenedioxy-$\Delta^{5(10)}$-19-nor-androsten-3β,6-diol, 4 cc. of pyridine and 2 cc. of acetic anhydride was kept at room temperature for 4 hours, pourned into ice water, the formed precipitate was filtered, washed with water and dried. There was thus obtained the diacetate of 17-ethylenedioxy-$\Delta^{5(10)}$-19-nor-androstene-3β,6-diol.

Example I

A suspension of 0.5 g. of 5% palladium on charcoal catalyst in 50 cc. of ethanol was hydrogenated for 30 minutes. A solution of 2 g. of 6-acetoxy-$\Delta^{5(10)}$-19-nor-androsten-3β-ol-17-one in 200 cc. of ethanol was added to the catalyst and the mixture was hydrogenated under stirring until absorption of 1 molar equivalent of hydrogen. After elimination of the catalyst by filtration the solution was evaporated and the crude residue purified by crstallization from methylene chloride-hexane, thus giving $\Delta^{5(10)}$-19-nor-androsten-3β-ol-17-one.

Example II

By following the method described in the preceding example, 2 g. of the diacetate of 17-ethylene-dioxy-$\Delta^{5(10)}$-19-nor-androstene-3β,6-diol were converted into the acetate of 17-ethylene-dioxy-$\Delta^{5(10)}$-19-nor-androsten-3β-ol.

A solution of 1.5 g. of the foregoing compound in 25 cc. of acetone was treated with 150 mg. of p-toluenesulfonic acid and the mixture was allowed to stand at room temperature for 4 hours, poured into water and extracted with methylene chloride. The organic extract was washed to neutrality, dried over anhydrous sodium sulfate and evaporated to dryness, thus producing the acetate of $\Delta^{5(10)}$-19-nor-androdsten-3β-ol-17-one.

Example III

The preceding example was repeated but using as starting materials 17-ethylenedioxy-6-chloro-$\Delta^{5(10)}$-19-nor-androsten-3β-ol actate and 17-ethylenedioxy-6-bromo-$\Delta^{5(10)}$-19-nor-androsten-3β-ol acetate, to produce in both cases the acetate of $\Delta^{5(10)}$-19-nor-androsten-3β-ol-17-one, identical to that obtained in said example.

Example IV

A solution of 1 g. of 6-acetoxy-17-ethylenedioxy-$\Delta^{5(10)}$-19-nor-androsten-3β-ol (mixture of 6α and 6β-isomers) in 30 cc. of a mixture of dioxane ether (1:1) was added over a 10 minute period to a stirred solution of 500 mg. of calcium in 150 cc. of liquid ammonia. When the blue color disappeared there was added 350 mg. of calcium followed by 5 cc. of methanol and the solution was stirred for 15 minutes further. There was then added 3 g. of ammonium chloride in 20 cc. of water and the ammonia was evaporated; the residue was diluted with water, 10 cc. of acetic acid was added and the product extracted with methylene chloride; the organic extract was washed with water to neutrality, dried and evaporated to dryness.

The oily product thus obtained was treated with p-toluenesulfonic acid in acetone, in accordance with the method described in Example II, to produce $\Delta^{5(10)}$-19-nor-androsten-3β-ol-17-one, identical to that obtained in Example I.

Example V

A stirred admixture of 1 g. of 6-acetoxy-17-ethylenedioxy-$\Delta^{5(10)}$-nor-androsten-3β-ol, 30 cc. of acetic acid and 500 mg. of activated zinc was heated on the steam bath for 30 minutes, the zinc was filtered off and washed with hot ethyl acetate, the filtrate was washed with 10% sodium carbonate solution and water to neutrality, dried over anhydrous sodium sulfate and evaporated to dryness under vacuo. The residue was dissolved in 20 cc. of acetone and treated with 100 mg. of p-tolenesulfonic acid, by following the technique described in Example II, to produce $\Delta^{5(10)}$-19-nor-androsten-3β-ol-17-one, identical to that obtained in the preceding examples.

*Example VI*

A solution of 1 g. of 6-acetoxy-17-ethylenedioxy-$\Delta^{5(10)}$-19-nor-androsten-3β-ol in 30 cc. of dioxane-ether (1:1) was added in a continuous stream to a solution of 0.1 g. of lithium in 100 cc. of anhydrous ethylamine, under stirring. At the end of the addition the blue color was destroyed by adding 5 g. of ammonium chloride and the solvent was evaporated. The product was extracted with ether, washed with water, dried and the ether evaporated. The oily residue was treated with p-toluenesulfonic acid in accordance with the method described in Example II, to produce $\Delta^{5(10)}$-19-nor-androsten-3β-ol-17-one, identical to that obtained in the preceding examples.

*Example VII*

A solution of 2 g. of $\Delta^{5(10)}$-19-nor-androsten-3β-ol-17-one in 60 cc. of anhydrous benzene was added, under an atmosphere of nitrogen, to a solution prepared by dissolving 2.8 g. of potassium in 60 cc. of t-amyl alcohol. A slow current of purified acetylene was passed through the solution for 40 hours, whereupon the solution was diluted with water and extracted with benzene. The organic extracts were then washed to neutral and dried over anhydrous sodium sulfate. Evaporation of the solvent and chromatography of the residue on 70 g. of alkaline alumina gave in the hexane-benzene (2:3) fractions 17α-ethinyl-$\Delta^{5(10)}$-19-nor-androstene-3β-17β-diol, that was crystallized from acetone-hexane.

*Example VIII*

A solution of 1 g. of the product obtained in the preceding example in 20 cc. of pyridine was added to a mixture of 1 g. of chromic trioxide in 20 cc. of pyridine. The reaction mixture was kept at room temperature overnight. It was then diluted with ethyl acetate, filtered through Celite and the filtrate washed well with water, dried and evaporated to dryness. Crystallization from acetone-hexane afforded 17α-ethinyl-$\Delta^{5(10)}$-19-nor-androsten-17β-ol-3-one identical to an authentic sample.

To a solution of 0.7 g. of the foregoing compound in 50 cc. of methanol there was added 0.1 cc. of concentrated hydrochloric acid and the reaction mixture was kept at room temperature overnight. It was then diluted with water, extracted with methylene chloride and the organic extract washed with water to neutrality, dried and evaporated to dryness. The residue was crystallized from acetone-hexane, to produce 17α-ethinyl-19-nor-testosterone, identical to an authentic sample.

*Example IX*

A solution of 2 g. of 17α-ethinyl-$\Delta^{5(10)}$-19-nor-androstene-3β,17β-diol in 80 cc. of anhydrous toluene and 6 cc. of cyclohexanone was dried by distilling off 10 cc. of the solvent. A solution of 2 g. of aluminum isopropoxide dissolved in 15 cc. of anhydrous toluene was then added and the mixture was refluxed for 45 minutes; 4 cc. of acetic acid was added and the solvents removed by steam distillation. The product was extracted several times with ethyl acetate and the organic extracts washed with 5% hydrochloric acid solution, water, 10% sodium carbonate solution and water until neutral, dried over anhydrous sodium sulfate and evaporated to dryness. The residue was crystallized from acetone-hexane to produce 1.7 g. of 17α-ethinyl-19-nor-testosterone identical to an authentic sample.

*Example X*

A slow current of purified acetylene was passed during 3 hours under anhydrous conditions through 10 cc. of a 3 N solution of ethinyl magnesium bromide in ether diluted with 40 cc. of anhydrous tetrahydrofuran. A solution of 2 g. of $\Delta^{5(10)}$-19-nor-androsten-3β-ol-17-one in 20 cc. of tetrahydrofuran was then added and the mixture was refluxed for 15 minutes, diluted with water, acidulated with hydrochloric acid and extracted with ethyl acetate. The extract was washed to neutral, dried and evaporated to dryness. Upon crystallization of the residue from acetone hexane there was obtained 17α-ethinyl-$\Delta^{5(10)}$-19-nor-androstene-3β,17β-diol identical to that obtained in Example VII.

*Example XI*

To a solution of 1 g. of 17α-ethinyl-19-nor-testosterone in 100 cc. of anhydrous benzene there were added 200 mg. of p-toluenesulfonic acid and 2 cc. of acetic anhydride and the mixture was allowed to stand for 24 hours at room temperature, poured into ice and water, and the resulting mixture stirred to effect hydrolysis of the excess anhydride. The benzene layer was separated and washed with 10% sodium carbonate solution and water. Drying, evaporation and crystallization of the residue from ether-hexane, yielded the acetate of 17α-ethinyl-19-nor-testosterone identical to an authentic sample.

In a similar manner but using propionic, caproic, enanthic and cyclopentylpropionic anhydride as esterifying agents there were obtained respectively the propionate, caproate, enanthate and cyclopentylpropionate of 17α-ethinyl-19-nor-testosterone.

*Example XII*

Example VII was repeated but using as starting material the acetate of $\Delta^{5(10)}$-19-nor-androstene-3β-ol-17-one to produce also 17α-ethinyl-$\Delta^{5(10)}$-19-nor-androstene-3β,17β-diol, identical to that obtained in the preceding examples.

I claim:

1. In the process for preparing a compound selected from the group consisting of 17α-ethinyl-$\Delta^{5(10)}$-19-nor-androsten-17β-ol-3-one and 17α-ethinyl-19-nor-testosterone, the step which comprises the elimination of the substituent at C–6 in a compound of the following formula:

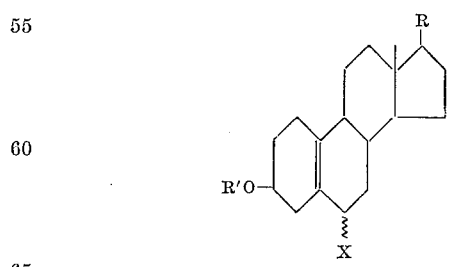

wherein R is selected from the group consisting of keto and ethylenedioxy; $R^1$ is selected from the group consisting of hydrogen and an acyl group of less than 12 carbon atoms and X is selected from the group consisting of chlorine, bromine and an acyloxy group of less than 12 carbon atoms, by hydrogenolysis.

2. The process of claim 1 wherein the hydrogenolysis is effected by catalytic hydrogenation in the presence of a heavy metal catalyst in a lower aliphatic alcohol as solvent.

3. The process of claim 1 wherein the hydrogenolysis is effected by reaction with calcium in liquid ammonia.

4. The process of claim 1 wherein the hydrogenolysis is effected by reaction with zinc in acetic acid.

5. The process of claim 1 wherein the hydrogenolysis is effected by reaction with lithium in ethylamine.

6. The process of claim 2 wherein the catalyst used is palladium on charcoal and the solvent is ethanol.

No references cited.

LEWIS GOTTS, *Primary Examiner.*

H. FRENCH, *Assistant Examiner.*